United States Patent
Dunbar

(10) Patent No.: US 10,481,820 B1
(45) Date of Patent: Nov. 19, 2019

(54) MANAGING DATA IN STORAGE SYSTEMS

(71) Applicant: EMC Corporation, Hopkinton, MA (US)

(72) Inventor: J. Michael Dunbar, Brimfield, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/983,631

(22) Filed: Dec. 30, 2015

(51) Int. Cl.
*G06F 3/06* (2006.01)

(52) U.S. Cl.
CPC .......... *G06F 3/0647* (2013.01); *G06F 3/0604* (2013.01); *G06F 3/0638* (2013.01); *G06F 3/0689* (2013.01)

(58) Field of Classification Search
CPC ...... G06F 3/0604; G06F 3/061; G06F 3/0638; G06F 3/0644; G06F 3/0647; G06F 3/0655; G06F 3/0683; G06F 3/0689; G06F 12/0897

USPC .................................. 711/117, 118, 162, 170
See application file for complete search history.

(56) References Cited

U.S. PATENT DOCUMENTS

| | | | |
|---|---|---|---|
| 2012/0095968 A1* | 4/2012 | Gold ................... | G06F 11/1456 707/652 |
| 2014/0156877 A1* | 6/2014 | Tylik ..................... | G06F 3/0605 710/18 |
| 2016/0147797 A1* | 5/2016 | Dolph ............... | G06F 17/30371 707/692 |

* cited by examiner

*Primary Examiner* — Gary J Portka
(74) *Attorney, Agent, or Firm* — Krishnendu Gupta; Deepika Bhayana

(57) ABSTRACT

A method is used in managing data in storage systems. A request is received to write data. A determination is made as to whether the data associated with the request can be relocated to a storage tier of a set of storage tiers based on a policy. The set of storage tiers includes first and second storage tiers. The first and second storage tiers are configured such that performance characteristics associated with the first storage tier is different from the second storage tier. Relocation of the data is managed to the storage tier of the set of storage tiers.

18 Claims, 6 Drawing Sheets

INDEX TABLE 115

| CHUNK | HASH VALUE | HEAT INFORMATION | REFERENCE COUNT | MAPPING POINTER |
|---|---|---|---|---|
| CHUNK-1 | HASH-1 | HEAT-1 | COUNT-1 | POINTER-1 |
| CHUNK-2 | HASH-2 | HEAT-2 | COUNT-2 | POINTER-2 |
| ... | ... | ... | ... | ... |
| CHUNK-n | HASH-n | HEAT-n | COUNT-n | POINTER-n |

FIG. 5

MANAGING DATA IN STORAGE SYSTEMS

BACKGROUND

Technical Field

This application relates to managing data in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

Large storage arrays today manage many disks that are not identical. Storage arrays use different types of disks and group the like kinds of disks into tiers based on the performance characteristics of the disks. A group of fast but small disks may be a fast tier (also referred to as "higher tier" or "high tier"). A group of slow but large disks may be a slow tier (also referred to as "lower tier" or "low tier"). It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost profile than storing all data on a single kind of disk.

A storage tier may be made up of different types of disks, i.e., disks with different redundant array of inexpensive disks (RAID) levels, performance and cost characteristics. In the industry there have become defined several levels of RAID systems. RAID (Redundant Array of Independent or Inexpensive Disks) parity schemes may be utilized to provide error detection during the transfer and retrieval of data across a storage system.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

Deduplication is a space-saving technology intended to eliminate redundant (duplicate) data (such as, files) on a data storage system. By saving only one instance of a file, disk space can be significantly reduced. For example, a file of size 10 megabytes (MB) may be stored in ten folders of each employee in an organization that has ten employees. Thus, in such a case, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves one unique copy of each block. For example, if only a few bytes of a document or presentation or a file are changed, only the changed blocks are saved. The changes made to few bytes of the document or the presentation or the file does not constitute an entirely new file.

SUMMARY OF THE INVENTION

A method is used in managing data in storage systems. A request is received to write data. A determination is made as to whether the data associated with the request can be relocated to a storage tier of a set of storage tiers based on a policy. The set of storage tiers includes first and second storage tiers. The first and second storage tiers are configured such that performance characteristics associated with the first storage tier is different from the second storage tier. Relocation of the data is managed to the storage tier of the set of storage tiers.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4-5 are diagrams illustrating in more detail components that may be used in connection with techniques herein.

DETAILED DESCRIPTION OF EMBODIMENT(S)

Figure 1:
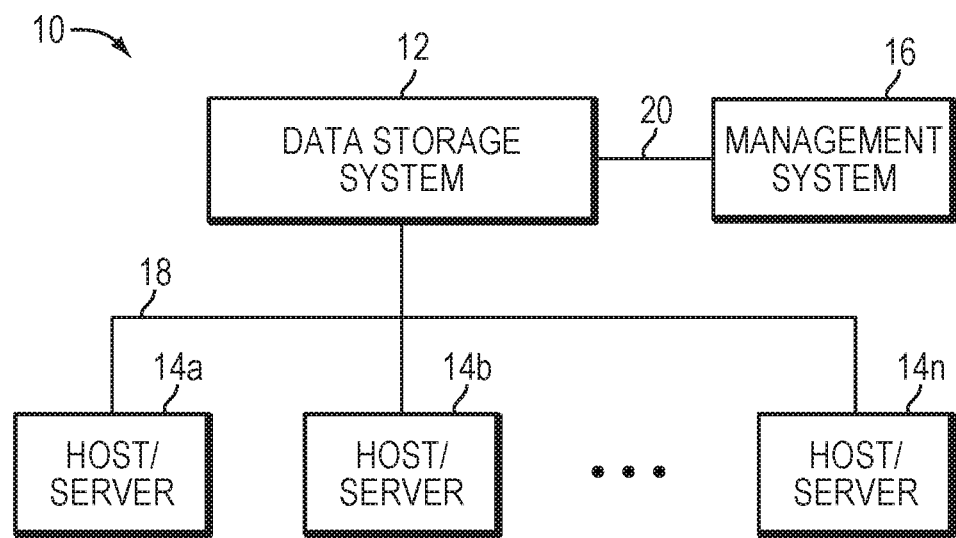
FIGS. 1-2 are examples of an embodiment of a computer system that may utilize the techniques described herein.

Described below is a technique for use in managing data in storage systems, which technique may be used to provide, among other things, receiving a request to write data, determining whether the data associated with the request can be relocated to a storage tier of a set of storage tiers based on a policy, wherein the set of storage tiers includes first and second storage tiers, the first and second storage tiers configured such that performance characteristics associated with the first storage tier is different from the second storage tier, and managing relocation of the data to the storage tier of the set of storage tiers.

Data deduplication is a process by which a data storage system can detect multiple identical copies of data and only keep a single copy of that data, thus eliminating the redundant data by removing other copies of that data and thus improving storage utilization. Thus, the data deduplication process has the ability to detect common blocks of data and maintain a single copy of the common blocks, thereby increasing the efficiency of storage devices by storing data in a reduced number of physical blocks. In at least some systems, data deduplication requires iterating over set of data blocks in one or more storage extents of a deduplication domain by processing digest information associated with each data block, finding the data blocks that contain identical information, and mapping the identical data blocks to a single copy of the data. Thus, in a deduplicated system, a single data block may represent a large number such as hundreds of deduplicated data blocks such that each deduplicated data block refers to the single data block stored on a storage device (e.g. a disk). In such systems, an index table of unique digests is created to find commonality among the data set. The size of this index table determines a window of deduplication opportunity. The larger the index table, the more blocks can be checked for duplicates, and thus the larger the opportunity for deduplication.

Generally, data deduplication for feature software requires that data blocks in a storage extent be iterated through based on a specific iteration scheme. A set of storage extents that are deduplicated together form a deduplication domain. During iteration of a deduplication domain, an index table of unique digests is created from data blocks that are iterated through. Further, during iteration of data blocks of a deduplication domain, digest for each data block is computed and compared with digests stored in an index table. If a matching digest for a data block is found in an index table, contents of data blocks are compared to verify that the data blocks are duplicates of each other, and the data block is deduplicated to an identical data block associated with the matching digest found in the index table by updating address mapping information of the deduplicated data block to point to the identical data block found using the index table. Further, if no matching digest for a data block is found in an index table, the digest for the data block is added to the index table. Thus, deduplication maps data blocks that contain identical information to a single copy of the data thereby consolidating I/O operations directed to the identical data blocks to the single copy of the data. Thus, a deduplicated data block may replace identical copies of one or more data blocks thereby increasing the number of references to the deduplicated data block.

Generally, a storage pool is a collection of storage that is provisioned for a logical unit. A storage pool may be a collection of disks, which may include disks of different types. Storage pools may further be subdivided into slices; for example a 1 gigabyte (GB) slice may be the allocation element for a logical unit. Further, a slice may be 4 KiloByte (KB), 32 KB, or 256 megabytes (MB) in size. A pool may include a set of storage tiers. Further, both a storage tier and a pool may have storage devices of different performance capabilities and costs. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

Large storage arrays today manage many disks that are not identical. Storage arrays use different types of disks and group the like kinds of disks into tiers based on the performance characteristics of the disks. A group of fast but small disks may be a fast tier (also referred to as "higher tier" or "high tier"). A group of slow but large disks may be a slow tier (also referred to as "lower tier" or "low tier"). It may be possible to have different tiers with different properties or constructed from a mix of different types of physical disks to achieve a performance or price goal.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels.

A disk may be a physical disk within the storage system. A LUN may be a logical unit number which is an identifier for a Logical Unit. Each slice of data may have a mapping to the location of the physical drive where it starts and ends.

Generally, slices are allocated to LUNs in a storage pool as "best-fit" at initial allocation time. In at least some cases, since the I/O load pattern of a slice is not known at initial allocation time, the performance capability of storage allocated may be too high or too low for effective data access on a slice. Furthermore, a data access pattern tends to change over time. Older data is accessed less frequently and therefore in at least many cases does not require storage with higher performance capability. Temperature of each storage slice is an indication of hotness of a slice, in other words, frequency and recency of slice I/Os. Better overall system performance can be achieved by placing hot slices to higher tier and cold slices to lower tier. Further, a tiered storage pool may include storage with different performance characteristics such that a logical unit created from storage space provisioned from the storage pool may include slices from different storage tiers with different performance characteristics.

Generally, an Auto-Tiering policy engine (PE) of a data storage system examines a storage pool's storage configuration and temperatures of all slices in that storage pool, and generates a slice relocation list. The slice relocation list identifies slices to be relocated with respective destination information. In general, slices in a storage pool are matched to the most appropriate respective tiers based on their respective temperatures (e.g., hot, cold) and tier preferences (e.g., High, Low, Optimal). If a slice's current tier differs from its matching tier, the slice is listed in the relocation candidate list. The PE is also referred to herein as the slice relocation process. An automated storage tiering process (also referred to herein simply as "slice relocation process") relocates slices among storage tiers in order to improve I/O performance, decrease system runtime cost and reduce disk drive wear. Slices are generally relocated by a slice relocation process in background.

In a conventional system, a deduplication technique is applied to a chunk of data whereas relocation of cold data is performed on a slice. Further, in such a conventional system, deduplication operations are performed using metadata such as index table which is separate from slice relocation operations that are performed using separate metadata such as slice map table. As a result, in such a conventional system, data is deduplicated separately from slice relocation process such that data deduplication uses separate metadata structures and does not take into account information regarding the each other's operations. Further, in such a conventional system, when a deduplicating technique is applied in a tiered storage pool, data blocks identified for deduplication may reside in different storage tiers having different performance capabilities. In such a conventional system, a conventional deduplicating technique does not take into account characteristics of physical storage on which data blocks that have been identified for deduplication reside. Further, in such a conventional system, even though a storage system supports auto-tiering (also referred to herein as "slice relocation") and data deduplication operations but both these operations are performed as separate operations at a separate times on different granularity of storage objects using different metadata structures. Further, in such a conventional system, data deduplication and slice relocation techniques are performed on separate storage objects using separate metadata structures having different level of mapping and abstractions thereby having no or minimal ability to provide optimal performance.

By contrast, in at least some implementations in accordance with the technique as described herein, the current technique performs slice relocation and data deduplication on the same granularity of data using the same metadata structure. In at least one embodiment of the current technique, data deduplication is performed on incoming data received from a host such that a data deduplicating technique is applied based on a policy. Further, in at least one embodiment of the current technique, subsequently, data on which the deduplicating technique is applied is relocated based on activity level of the data. In at least one embodiment of the current technique, slice relocation is performed on the same granularity of data on which a deduplicating technique is applied. Thus, in at least one embodiment of the current technique, when data objects are identified for deduplication, storage tiers on which the data objects reside are taken into consideration for relocating the data objects. In at least one embodiment of the current technique, when a data deduplicating technique is applied on data, new unique chunks of data are identified and initially stored on a specific storage tier based on a policy such that existing chunks of data may be relocated to other storage tiers based on activity level and temperature of the data which may further be based on a policy (e.g., placing actively accessed data on a high speed flash based storage device and less frequently accessed data on a slow storage device). Further, for example, in at least one embodiment of the current technique, data that may be rarely accessed can be placed on a large and less expensive storage disks which may be spun down to conserve energy and reduce operating expense. Similarly, for example, in at least one embodiment of the current technique, frequently accessed data that is re-written often may be placed on high-endurance flash devices, while data that has a high degree of read accesses may be placed on less expensive and low durability flash devices. It should be noted that the current technique may be applied on any number of data protocols such as file, block or backup streams.

In at least some implementations in accordance with the technique as described herein, the use of the managing data in storage systems technique can provide one or more of the following advantages: lowering costs by improving deduplication efficiency, improving memory utilization by evaluating characteristics of physical storage (e.g., storage tier, drive type, disk type) on which data objects selected for deduplication reside on and using the same metadata structures for performing both deduplication and slice relocation, reducing cost by combining data deduplication with storage tiering based on activity level of the data, and reducing operating cost of a storage system by placing cold data on a low cost storage devices and placing a large amount of data on storage disks that may be spun down.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

Given the different performance characteristics, one or more tiers of storage devices may be defined. The physical devices may be partitioned into tiers based on the performance characteristics of the devices; grouping similar performing devices together. Conversely, the particular performance characteristics may be applied to a storage pool with or without the definition of tiers. The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
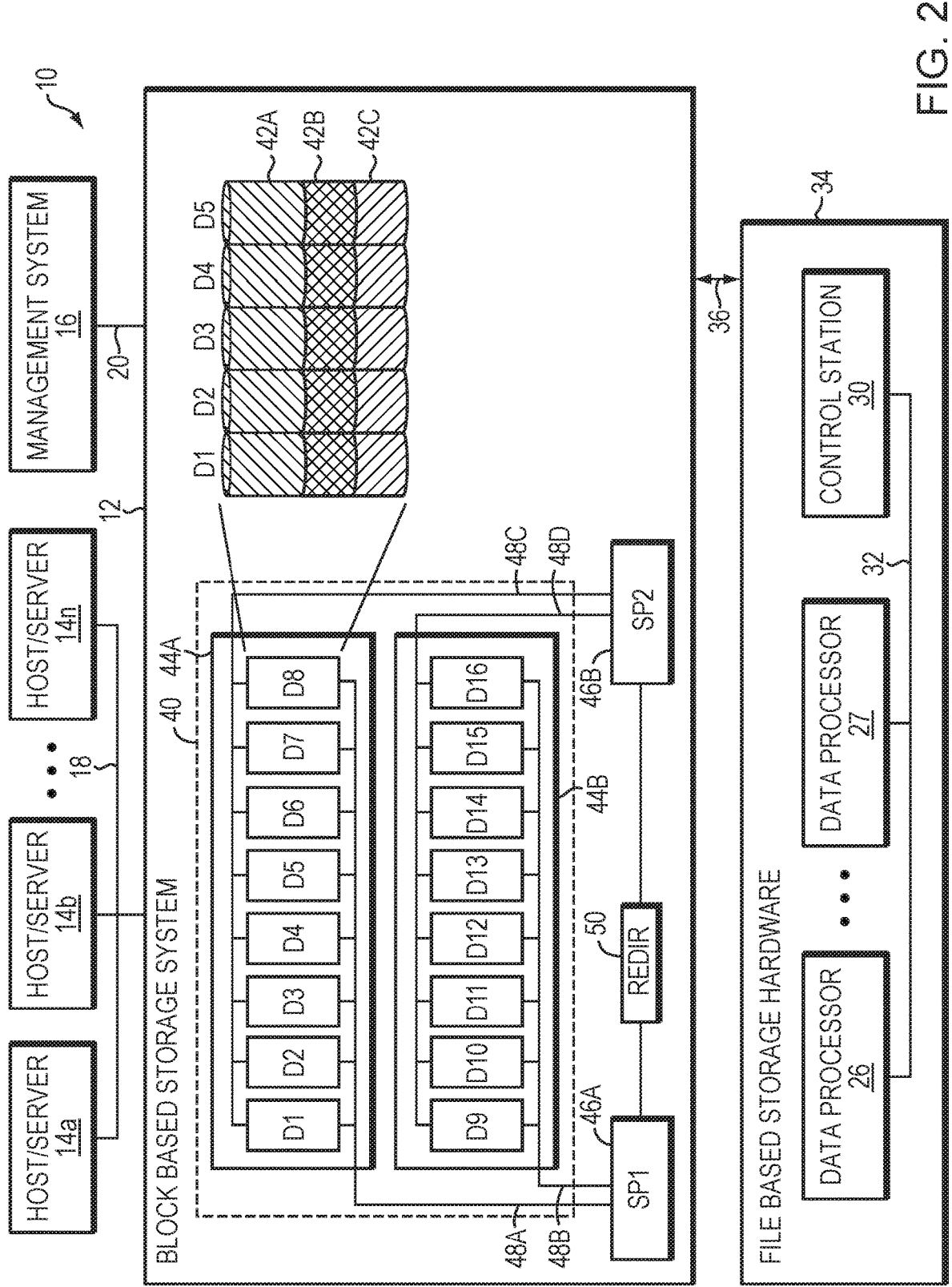

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (IO) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 2, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (IO) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 2, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Generally, designs of block-based and file-based data storage systems often follow parallel paths. Further, many of the features provided by block-based storage, such as replication, snaps, de-duplication, migration, failover, and non-disruptive upgrade, are similar to features provided for file-based data storage systems. For user convenience, block-based and file-based storage systems are sometimes co-located, essentially side-by-side, to allow processing of both block-based and file-based host IOs in a single combined system as illustrated in FIG. 2. Alternatively, both block-based and file-based functionality may be combined in an unified data path architecture. The unified data path architecture brings together IO processing of block-based storage systems and file-based storage systems by expressing both block-based objects and file-based objects in the form of files. These files are parts of an underlying, internal set of file systems, which is stored on a set of storage units served by a storage pool. Because both block-based objects and file-based objects are expressed as files, a common set of services can be applied across block-based and file-based objects for numerous operations, such as replication, snaps, de-duplication, migration, failover, non-disruptive upgrade, and/or many other services, as these services are performed similarly for both block and file objects on the same underlying type of object-a file. Further, the unified data path architecture increases storage utilization by reallocating storage resources once allocated to block-based storage to file-based storage, and vice-versa. As block-based objects (e.g., LUNs, block-based vVols, and so forth) and file-based objects (e.g., file systems, file-based vVols, VMDKs, VHDs, and so forth) are expressed as underlying files, storage units released by any underlying file or files can be reused by any other underlying file or files, regardless of whether the files represent block-based objects or file-based objects. Additional details regarding the unified data path architecture is described in U.S. patent application Ser. No. 13/828,322 for "Unified DataPath Architecture", filed Mar. 14, 2013, the contents and teachings of which are hereby incorporated by reference in their entirety.

In at least one embodiment of the current technique, the unified data path architecture requires a file system to be hosted on a mapped LUN as a file system on a file.

Figure 3:
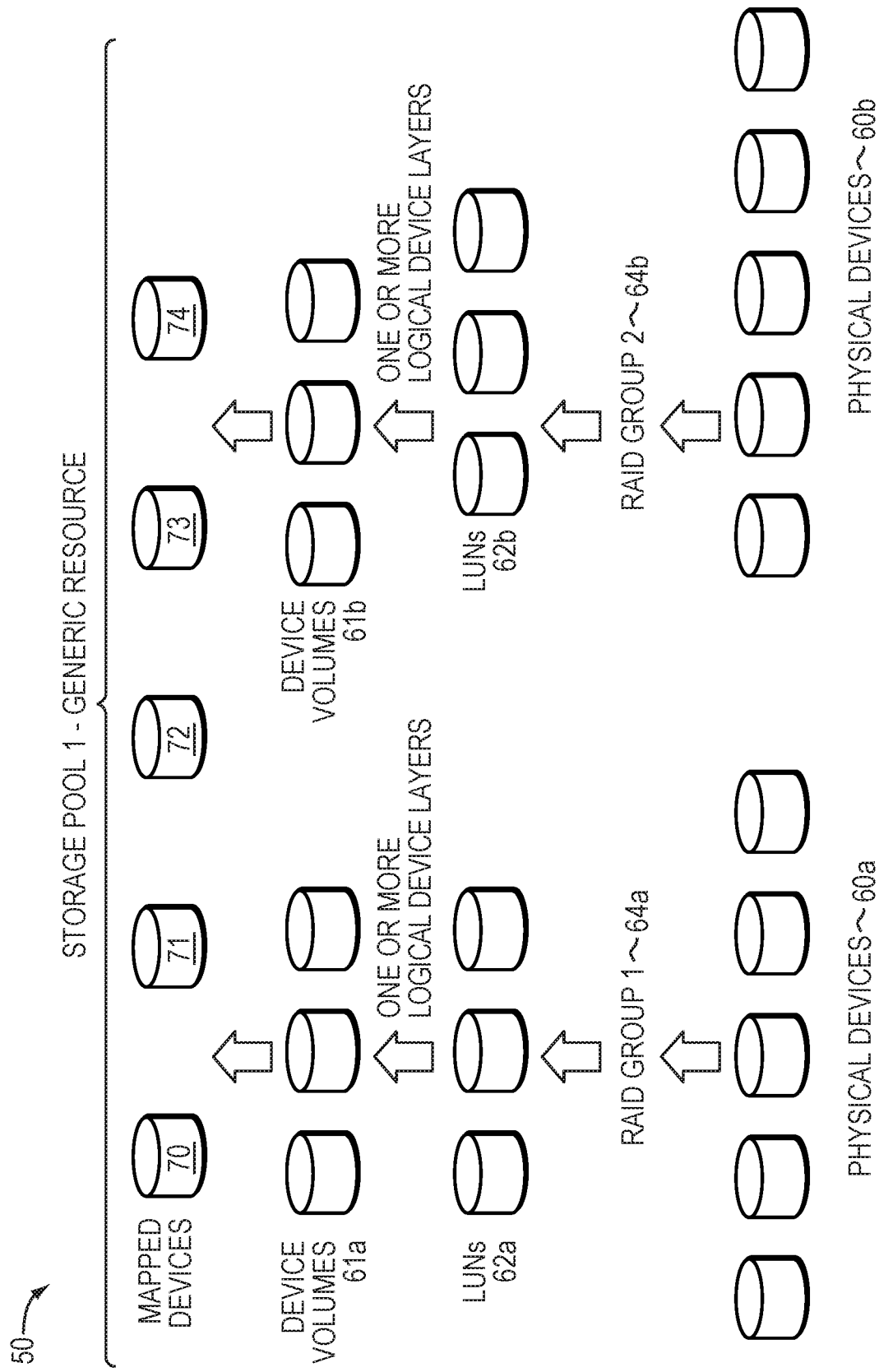
FIG. 3 is an example illustrating storage device layout.

FIG. 3 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62. Thus, a deduplication domain consists of a set of storage extents which includes a set of deduplicated LUNs sharing a common set of blocks.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the "thin logical unit" ("TLU") mapped device is not mapped directly to physical storage space. Instead, portions of the mapped storage device for which physical storage space exists are mapped to data devices such as device volumes 61$a$-61$b$, which are logical devices that map logical storage space of the data device to physical storage space on the physical devices 60$a$-60$b$. Thus, an access of the logical storage space of the "thin logical unit" ("TLU") mapped device results in either a null pointer (or equivalent) indicating that no corresponding physical storage space has yet been allocated, or results in a reference to a data device which in turn references the underlying physical storage space.

Figure 4:
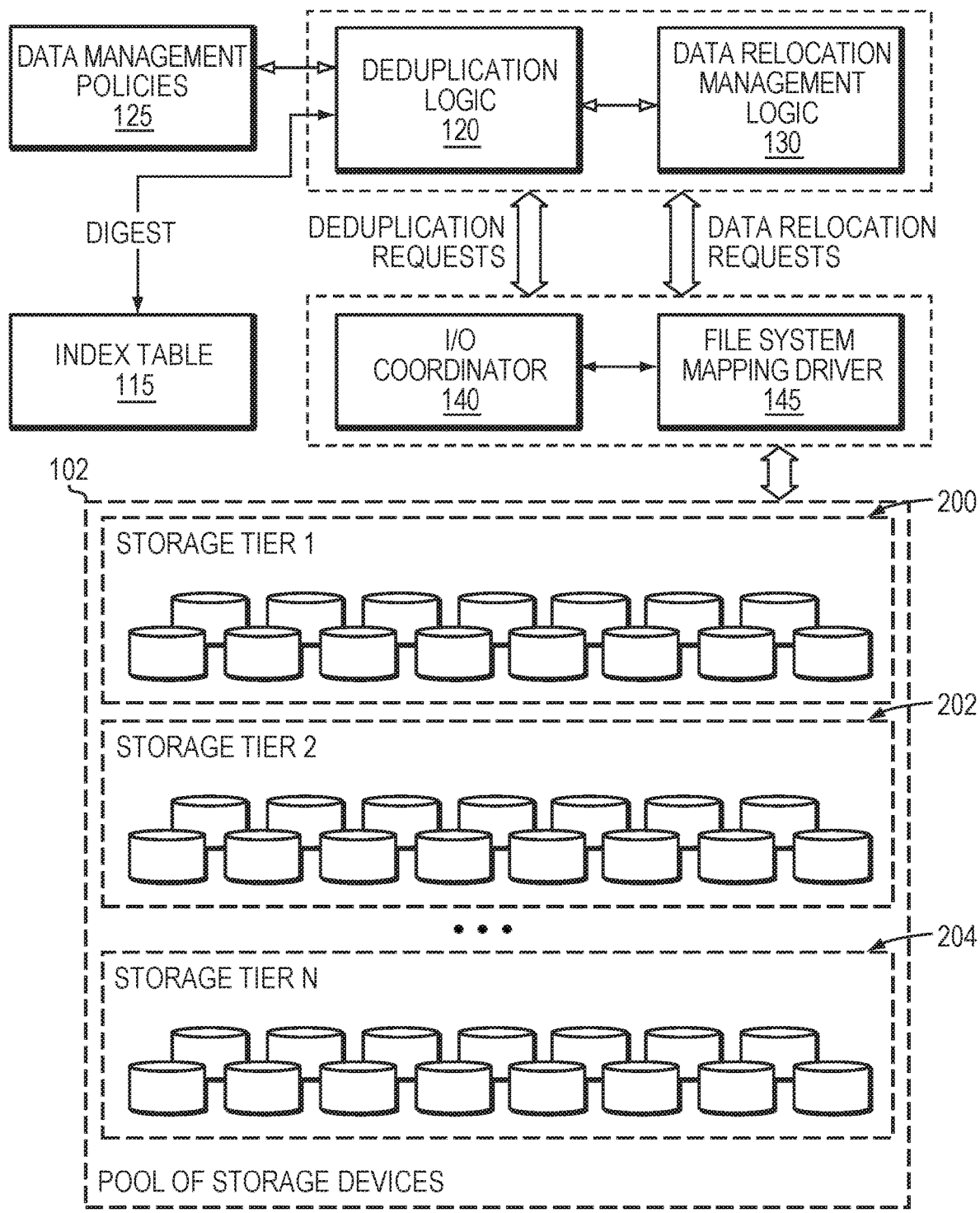

Referring to FIG. 4, shown is a more detailed representation of components that may be included in an embodiment using the techniques herein. With reference also to FIGS. 1-3, in a deduplication domain, each storage extent contains a set of storage tiers. For example, in FIG. 4, storage pool 102 may include one or more storage tiers 200, 202, and 204 such that each storage tier has different performance characteristics. A goal of a deduplication process is to maintain only a single copy of each unique set of data. Software or other logic executing the deduplication process examines data in a deduplication domain in fixed sized chunks and determines whether the data stored in a chunk is the same as the data stored in another chunk in the same deduplication domain. If so, an address map for the LUNs is manipulated so that respective address map entries for the chunks reference the same physical chunk of data, and then the chunks that currently hold the extra copies of the data are freed up as unused storage. The address map for the LUNs stores a mapping of logical block addresses to physical block addresses. In at least some embodiments of the current technique, the fixed sized chunk can be a data block.

In at least one embodiment of the current technique, deduplication logic 120 can be provided on data storage system 12. In an alternative embodiment, deduplication logic 120 may be provided also or instead on a host system, such as host system 14. As described elsewhere herein, deduplication logic 120 may be performed in a manner that is transparent to an application running on a host system. In at least one embodiment of the current technique, a deduplication server provides deduplication services in data storage system 12 by working in conjunction with I/O Coordinator 140 and File system mapping driver 145. I/O Coordinator 140 manages I/O operations in conjunction with the file system mapping driver 145. I/O Coordinator 140 provides framework for implementing digest and other I/O requests issued by the deduplication server. File system mapping driver 145 is a light-weight file system library that provides file system functionality and allows data storage system 12 to create files within a file system. File system mapping driver 145 processes I/Os directed to metadata of a file system and provides information regarding metadata (e.g., deduplication key, data block mapping information) of a data block that is potentially a candidate for deduplication.

In at least one embodiment of the current technique, deduplication logic 120 iterates through deduplication domains including logical units and schedules data deduplication processes based on data management policies 125 to perform data deduplication. Further, data deduplication logic 120 performs data deduplication on a deduplication domain by iterating through data blocks of the deduplication domain, obtain digests for the data blocks, identifies deduplication candidates, and issues deduplication requests to deduplication server. In at least one embodiment of the current technique, deduplication logic 120 also computes digests and remaps blocks after the deduplication technique is applied to remove duplicate blocks of data. A deduplication database (e.g. an index table) is maintained for a deduplication domain. A digest is created for each chunk of data (e.g., a data block) that is identified as a candidate for deduplication. Deduplication logic 120 detects potential duplicate copies of data and issues a request to the deduplication server to deduplicate the data based on a deduplication policy. Further, a data deduplicating technique may be applied either as a background process on data residing on storage disks or on incoming data received as a part of a write request from a host.

The deduplication database is stored on one of the storage extents that include one or more LUNs. An index table 115 may also be maintained on a LUN located in the same pool as the deduplication domain. In at least some implementations, an index table is a persistent hash-table of chunk-IDs keyed by the digest of the data stored in the chunk. The index table 115 need not contain entries for every data chunk in the deduplication domain, but the effectiveness of deduplication is a function of the number of entries stored in the index table 115. The more entries in the index table, the more likely that duplicate blocks will be detected during deduplication processing.

During deduplication processing as described herein, deduplication server provides deduplication services by interacting with I/O coordinator 140 and file system mapping driver 145. Deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., index table 115) that maintains a digest (e.g., SHA, checksum) for each block. When two blocks have the same digest they have a sufficiently high probability of containing the same data to warrant a bit-for-bit comparison to confirm they are exact duplicates. Remapping leverages dynamic block-mapping technology of file system mapping driver 145. A file system allows dynamic manipulation of the address maps that connects LUN's logical address space to its physical address space. The file system also allows mapping a single block of storage at multiple locations within the file system, and allows handling of writes to shared blocks by allocating new storage and updating the shared address mappings. I/O coordinator 140 manages I/O operations in conjunction with the file system mapping driver 145. I/O coordinator 140 provides framework for implementing digest and other I/O requests issued by the deduplication server.

Thus, data deduplication process identifies data blocks for deduplication, compare data digest information of the data blocks, identify candidate data blocks for deduplication, issue deduplication requests based on a deduplication policy (e.g., characteristics of storage space on which candidate data blocks reside), and maintain index table 115. Further, I/O coordinator 140 and file system mapping driver 145 working in conjunction with one another process deduplication requests received from deduplication server. File system mapping driver 145 performs a deduplication operation by freeing up redundant instances of a deduplicated data block.

It should be noted that a set of data management policies 125 may be initialized and selected by a data storage system. Further, it should be noted that a set of data management policies may be selected by a user of a data storage system.

In at least one embodiment of the current technique, data storage systems that comprise storage devices of varied performance characteristics grouped into tiers can be managed in such a way as to migrate data from one portion of the storage pool to another portion of the storage pool. A particular embodiment may help achieve this migration by automatically migrating data among the tiers based on the "temperature" of contents of a data chunk and location of the data chunk on storage devices. In general, temperature may correspond to, for example, how often and how recently the data is accessed. For example, hot data may refer to data that has been accessed recently and is accessed often, cold data may refer to data that has not been accessed recently and is not accessed often. Data temperature may be further segmented to include a warm data category that may include data that is less hot than hot data and/or less cold than cold data. Hence, warm data may refer to data that is accessed more often than cold data and less often that hot data. In general, in accordance with an embodiment of the current technique, hot data is migrated to faster (and typically more expensive) storage, and cold data is migrated to slower (and typically less expensive) storage. Warm data may be migrated to either type of storage and such storage may be configurable to be placed in a reduced power consumption state. Migration may be accomplished by copying the data and changing the map entries for the logical addresses that were involved to reflect the new logical to physical association. Thus, hot data may be stored in disk drives indicated as hot disks and cold data may be stored in disk drives indicated as cold disks.

Additional details regarding slice relocation and tiered data storage arrays are disclosed in U.S. patent application Ser. No. 12/826,434, filed on Jun. 29, 2010 and entitled, "MANAGING MULTI-TIERED STORAGE POOL PROVISIONING" and U.S. patent application Ser. No. 12/824,816, filed on Jun. 28, 2010 and entitled, "METHODS, SYSTEMS, AND COMPUTER READABLE MEDIUM FOR TIER-BASED DATA STORAGE RESOURCE ALLOCATION AND DATA RELOCATION IN A DATA STORAGE ARRAY" which are incorporated by reference herein in their entireties.

In at least one embodiment of the current technique, data relocation management logic 130 (also referred to as "Auto-Tiering policy engine (PE)" or "slice relocation process") may shift hot slices of a logical volume to upper tiers and cold slices of the logical volume down to lower tiers. The goal of the slice relocation process is to put hot, frequently accessed slices to higher tiers and maximize the utilization of these high tiers, which include faster but more expensive drives such as a flash storage drives. Data relocation management logic 130 relocates a storage object (e.g., a slice, a chunk of data) based on the temperature of the storage object. The temperature of a storage object is determined based on I/O activity directed to the storage object. I/O activity of a storage object is an indicator of current I/O load of the storage object. Storage object I/O activity is computed using raw slice statistics. The computation may be done in any of several different ways. The specific computation to use may depend on the system I/O traffic pattern. In at least some cases, the simplest and most straightforward calculation is to use total storage objects I/O counts as a function of time as I/O activity, such that the storage object I/O load is the moving average of storage object I/O counts.

In at least one embodiment of the current technique, data relocation management logic 130 works in conjunction with file system mapping driver 145 and I/O coordinator 140 to relocate storage objects. Further, in at least one embodiment of the current technique, data relocation management logic 130 uses the same index table 115 for determining temperature of a storage object selected for relocation which is used by deduplication logic 120. In at least one embodiment of the current technique, the index table 115 includes information such as temperature information (also referred to herein as "heat information"), reference count, mapping pointer for a storage object such that data relocation may be performed on the storage object on which deduplicating technique has been applied.

Referring to FIG. 5, shown is a more detailed representation of components that may be included in an embodiment using the techniques herein. With reference also to FIGS. 1-4, in at least one embodiment of the current technique, index table 115 used by deduplication logic 120 may be expanded to include information required for relocating storage objects such as data chunks on which a deduplicating technique has been applied. Thus, in at least one embodiment of the current technique, the index table that is generally used for storing information such as digest and hash value for a data chunk for determining whether the data chunk may be deduplicated further includes for each data chunk, heat information indicating temperature and activity level of a data chunk, reference count indicating how many data chunks have been mapped to the data chunk, and mapping pointer associated with the data chunk. Thus, after data deduplication is performed on a data chunk, data relocation may be performed on the data chunk subsequently at a later time using the index table 115 that is also used for deduplicating the data chunk. Thus, in at least one embodiment of the current technique, a storage system does not maintain two separate metadata structures for deduplicating and relocating data chunks.

Figure 6:
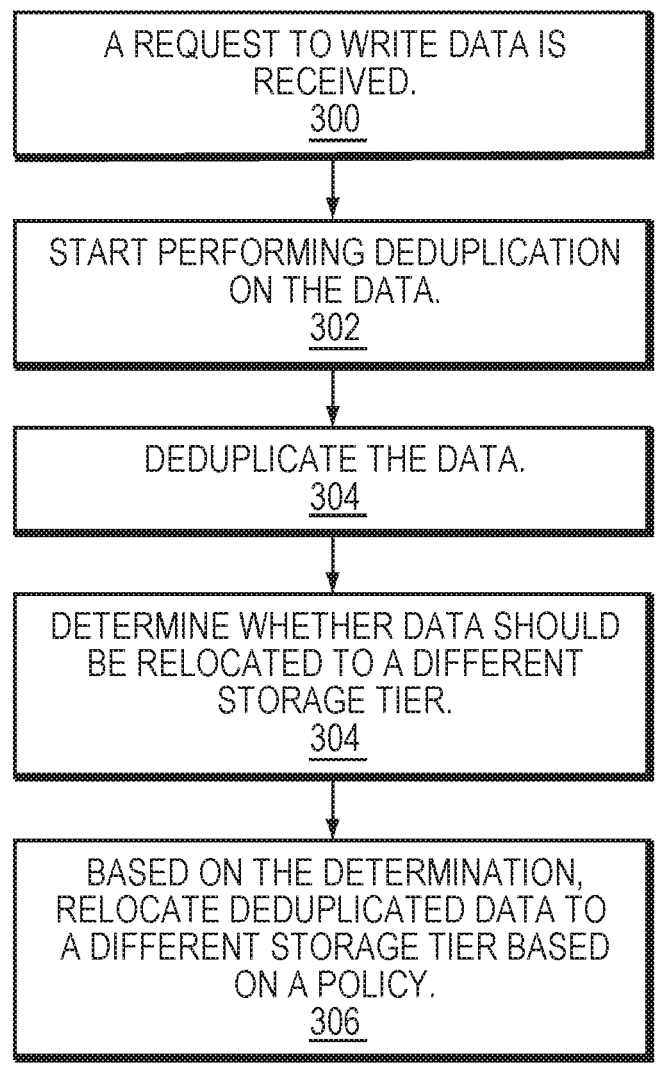
FIG. 6 is a flow diagram illustrating processes that may be used in connection with techniques herein.

Referring to FIG. 6, shown is a flow diagram illustrating a flow of data in the data storage system. With reference also to FIGS. 1-5, a request (e.g., a write request) to write data is received (step 300). A data deduplicating technique is applied on the data (step 302) and data is deduplicated (step 304). The data may be deduplicated based on a policy. Further, the data on which the deduplicating technique is applied is relocated to appropriate storage tier based on characteristics of data such as temperature, storage devices, and a policy (step 306).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data in storage systems, the method comprising:

receiving a request to write data;

determining whether to apply a deduplicating technique to the data;

based on the determination, applying the deduplicating technique to the data for deduplicating the data to an existing data by using a single index table, wherein a storage tier of a set of storage tiers on which the existing data resides is evaluated for relocating the existing data to another storage tier;

determining whether the existing data can be relocated to the another storage tier of the set of storage tiers based on a policy, wherein the policy uses information, from the single index table, including an activity level associated with the data, wherein the set of storage tiers includes first and second storage tiers, the first and second storage tiers configured such that performance characteristics associated with the first storage tier is different from the second storage tier, wherein the single index table further includes a mapping pointer for a storage object such that data relocation can be performed on the storage object on which the deduplication technique has been applied; and managing relocation of the existing data to the another storage tier of the set of storage tiers.

2. The method of claim 1, further comprising
applying the deduplicating technique to the data associated with the request in conjunction with managing relocation of the data.

3. The method of claim 1, wherein the deduplicating technique uses the same metadata structure which is used for relocating the data.

4. The method of claim 2, wherein the existing data is subsequently relocated after the deduplicating technique is applied on the data.

5. The method of claim 2, wherein the deduplicating technique and relocation is performed on a set of data blocks residing on a storage extent comprising a set of LUNs, wherein each LUN of the set of LUNs is a logical representation of a subset of a physical disk storage.

6. The method of claim 1, wherein the data includes a data block, wherein a data block is a fixed size chunk of physical disk storage.

7. The method of claim 6, wherein a digest is associated with a data block, wherein the digest is based on contents of the data block and uniquely identifies the data block.

8. The method of claim 6, wherein the index table is used for applying the deduplicating technique and relocating the data, wherein the index table comprises a set of index entries, wherein each index entry of the set of index entries includes digest information and heat information for applying the deduplicating technique and relocating the data.

9. The method of claim 1, wherein a storage tier includes a disk drive system comprising a plurality of Redundant Array of Inexpensive Disks (RAID) systems, each RAID system of the plurality of RAID systems having a first disk drive and a second disk drive.

10. A system for use in managing data in storage systems, the system comprising a processor configured to:
receive a request to write data;
determine whether to apply a deduplicating technique to the data;

based on the determination, apply the deduplicating technique to the data for deduplicating the data to an existing data by using a single index table, wherein a storage tier of a set of storage tiers on which the existing data resides is evaluated for relocating the existing data to another storage tier;

determine whether the existing data can be relocated to the another storage tier of the set of storage tiers based on a policy, wherein the policy uses information, from the single index table, including an activity level associated with the data, wherein the set of storage tiers includes first and second storage tiers, the first and second storage tiers configured such that performance characteristics associated with the first storage tier is different from the second storage tier, wherein the single index table further includes a mapping pointer for a storage object such that data relocation can be performed on the storage object on which the deduplication technique has been applied; and managing relocation of the existing data to the another storage tier of the set of storage tiers.

11. The system of claim 10, wherein the processor is further configured to
apply the deduplicating technique to the data associated with the request in conjunction with managing relocation of the data.

12. The system of claim 10, wherein the deduplicating technique uses the same metadata structure which is used for relocating the data.

13. The system of claim 12, wherein the data is subsequently relocated after the deduplicating technique is applied on the data.

14. The system of claim 12, wherein the deduplicating technique and relocation is performed on a set of data blocks residing on a storage extent comprising a set of LUNs, wherein each LUN of the set of LUNs is a logical representation of a subset of a physical disk storage.

15. The system of claim 10, wherein the data includes a data block, wherein a data block is a fixed size chunk of physical disk storage.

16. The system of claim 15, wherein a digest is associated with a data block, wherein the digest is based on contents of the data block and uniquely identifies the data block.

17. The system of claim 15, wherein the index table is used for applying the deduplicating technique and relocating the data, wherein the index table comprises a set of index entries, wherein each index entry of the set of index entries includes digest information and heat information for applying the deduplicating technique and relocating the data.

18. The system of claim 10, wherein a storage tier includes a disk drive system comprising a plurality of Redundant Array of Inexpensive Disks (RAID) systems, each RAID system of the plurality of RAID systems having a first disk drive and a second disk drive.

* * * * *